(12) United States Patent
Leb

(10) Patent No.: US 6,742,293 B2
(45) Date of Patent: Jun. 1, 2004

(54) ADVERTISING SYSTEM

(75) Inventor: David E. Leb, Hampstead (CA)

(73) Assignee: Cyber World Group, St. Laurent (CA)

( * ) Notice: Subject to any disclaimer, the term of this patent is extended or adjusted under 35 U.S.C. 154(b) by 0 days.

(21) Appl. No.: 10/071,080

(22) Filed: Feb. 11, 2002

(65) Prior Publication Data

US 2002/0078609 A1 Jun. 27, 2002

(51) Int. Cl.[7] ............................................. G09F 21/02
(52) U.S. Cl. ...................................................... 40/586
(58) Field of Search ........................................... 40/586

(56) References Cited

U.S. PATENT DOCUMENTS

| | | | |
|---|---|---|---|
| 2,851,805 A | | 9/1958 | Allen |
| 4,594,276 A | | 6/1986 | Relyea |
| 5,052,418 A | | 10/1991 | Miller |
| 5,107,868 A | | 4/1992 | Aryee |
| 5,470,351 A | | 11/1995 | Ross et al. |
| 5,676,401 A | | 10/1997 | Witkowski et al. |
| 5,776,586 A | * | 7/1998 | Lipper ........................ 428/195 |
| 5,816,269 A | | 10/1998 | Mohammed |
| 5,836,998 A | | 11/1998 | Mueller et al. |
| 5,928,797 A | | 7/1999 | Vineberg |
| 5,939,142 A | * | 8/1999 | Comiskey et al. .......... 427/256 |
| 6,013,122 A | | 1/2000 | Klitzman et al. |
| 6,161,554 A | | 12/2000 | Dunlap-Harris |
| 6,192,890 B1 | | 2/2001 | Levy et al. |
| 6,235,273 B1 | | 5/2001 | Mackey |
| 6,341,831 B1 | * | 1/2002 | Weber et al. .................. 347/1 |

FOREIGN PATENT DOCUMENTS

FR          2332717 A          6/1977

JP          10188005          12/1999

OTHER PUBLICATIONS

Bill Simmons, "The 13th Round," Oct. 1, 2001, ESPN, (http://espn.go.com/page2/s/simmons/011001.html).*

Steve Kim, "Back–Ads Banned in Nevada," Jan. 10, 2002, MaxBoxing.com, (http://www.maxboxing.com/Kim/kim011002.asp).*

"Advertising tattoos all the rage in boxing circles," May 14, 2002, Philly.com (http://www.philly.com/mld/dailynews/sports/3258791.htm).*

BoxingGurus.com biography of Felix Trinidad (http://www.boxinggurus.com/trinidadf.html).*

* cited by examiner

Primary Examiner—Gary Hoge
(74) Attorney, Agent, or Firm—Dickstein Shapiro Morin & Oshinsky LLP

(57) ABSTRACT

An advertising method utilizes a person's body, such as the skin of the person's upper back and shoulder region, which is ideally exposed, broad and planar. The advertisement may be displayed during a sporting/entertainment event which is broadcast to a large audience through visual media such as television. In one embodiment, the event is a boxing match and the advertisement affixed on the boxer's back promotes an on-line wagering service. The advertised service can be employed or accessed during the boxing match or immediately after the advertisement is seen by the consumer. The advertisement is sufficiently large to be legible and comprehensible by the viewing audience. The advertisement may be formed of a suitable dye, ink or paint that can be removed after the match, but which is resistant to smudging from physical contact and/or perspiration.

15 Claims, 3 Drawing Sheets

ADVERTISING SYSTEM

BACKGROUND OF THE INVENTION

The present invention relates generally to the field of marketing and advertising. More specifically, the invention relates to an advertising method that utilizes a surface portion of a person's body. In the fields of marketing and advertising, various attempts are made to cost-effectively increase sales of goods and services. A particular advertisement or advertising campaign may be deemed successful if it results in an increase in sales and revenue, net of advertising costs. The question of whether a specific campaign is effective may be determined by evaluating its effect on customer loyalty, brand name recognition, brand name distribution and the like.

Marketing and advertising schemes are devised and broadly implemented in an effort to find the most effective and least costly way of increasing sales and revenue. Known attempts to gain the attention of consumers include catchy slogans, startling artwork, novelty items, contests, prizes, redeemable coupons and, in some cases, even the inclusion of token sums of money.

Display advertising is widely used because of its ability to reach a broad range of potential customers. Display advertising is generally limited, however, in the sense that an advertiser cannot accurately gauge the success of any particular display advertisement. For example, an advertiser may decide to place an advertisement on a billboard located alongside a busy highway. The return for the advertiser's significant investment is the likelihood that many potential customers will see the billboard each day as they drive past it on the highway. From the advertiser's perspective, the mere fact that many people see the advertisement serves as a basis for the hope that the ad is effective.

A particular advertiser may not, however, have any precise means for estimating how much business is developed due to a particular display advertisement. It may be difficult, for example, to know how many people have seen the advertisement. Moreover, it may be difficult to assess how many people, out of all those who see the advertisement, are potential customers for the advertised product or service. With display advertisements, a large percentage of people viewing a particular advertisement may have never used the product or service and/or will never use it despite having seen it advertised. This limitation of display advertisements can be attributed at least in part to the random composition of most advertising audiences.

Advertisements that advertise products or services that are targeted to a particular audience may be more effective. For example, sportswear companies may target potential customers at sporting arenas and stadiums, whereas cereal companies may advertise in supermarkets. Thus, advertisers and marketers have suggested various schemes to display advertisements to targeted or specialized groups of consumers. For example, a squeegee handle having polygonal sides may be used to provide display advertising space. An advertisement displayed on such a handle could be targeted to gasoline customers using a credit-card point of sale fuel pump terminal. A drawback with this type of advertising is that while the advertisement may be cost effective, it is not particularly eye-catching nor impressionable to the consumer. In fact, customers may be preoccupied with other activities and may not even notice the advertisement at all. For instance, a customer may be monitoring the amount of gasoline being purchased, washing the windshield, etc. Television advertising may be intended to be seen by a targeted group of potential consumers, but such advertising can be expensive, complicated and time-consuming to produce.

Further, it appears that a display advertisement is more effective if it is seen by the same person repeatedly. In that regard, advertisers have implemented various display advertisement schemes wherein an advertisement is appended to a useful item that is kept by a potential consumer for continued reference. For example, it has been suggested to provide a bulk-mail card bearing a display advertisement with useful information printed on a portion of the card, such that the card would be retained by its recipient for continued reference. A drawback with this system is that it is difficult for the advertiser to assess in advance whether the printed information will be deemed useful by each card recipient. In other words, there is no guarantee that the advertisement will be seen repeatedly by the targeted consumer. Similarly, with respect to known television advertising systems, a targeted potential customer may simply change the channel during the advertisement or be preoccupied with other activities and the advertisement may never be seen enough times or for a sufficient duration to have the desired impact.

Thus, a continuous need exists for a method of advertising that gains the attention of numerous consumers. Further, there is a need to provide advertising in an efficient manner to gain more sales per advertising dollar. Further, there is also a need to provide greater assurance that the advertisement will actually be seen by the potential customers, considering the duration and repetition of the advertisement.

SUMMARY OF THE INVENTION

The present invention provides an improved advertising system. The new system is eye-catching and capable of efficiently reaching a very large number of targeted people repeatedly (or for an extended duration), but yet, is very cost-effective. The invention may be employed to provide greater assurance to the advertiser that the advertisement is actually seen by the desired audience. In a preferred embodiment of the invention, a person's back is used as a support for the advertisement. The human back skin surface area (particular, the back surface that extends over and between the shoulder blades) may be ideally exposed, broad and planar for affixing and displaying the advertisement.

According to one aspect of the invention, the advertisement may be provided on the person's back for display during a sporting/entertainment event which is broadcast to a large audience through audio/visual media such as television. According to one aspect of the invention, the event is a boxing match and the advertisement is affixed directly on the boxer's back. The advertisement is sufficiently large such that it is legible and comprehensible to the viewing audience. Also, the advertisement is affixed utilizing a material which is removable but yet resistant to smudging from physical contact and/or perspiration.

BRIEF DESCRIPTION OF THE DRAWINGS

The foregoing and other advantages and features of the invention will become more apparent from the detailed description of preferred embodiments of the invention given below with reference to the accompanying drawings in which.

DETAILED DESCRIPTION OF PREFERRED EMBODIMENTS

Figure 1:
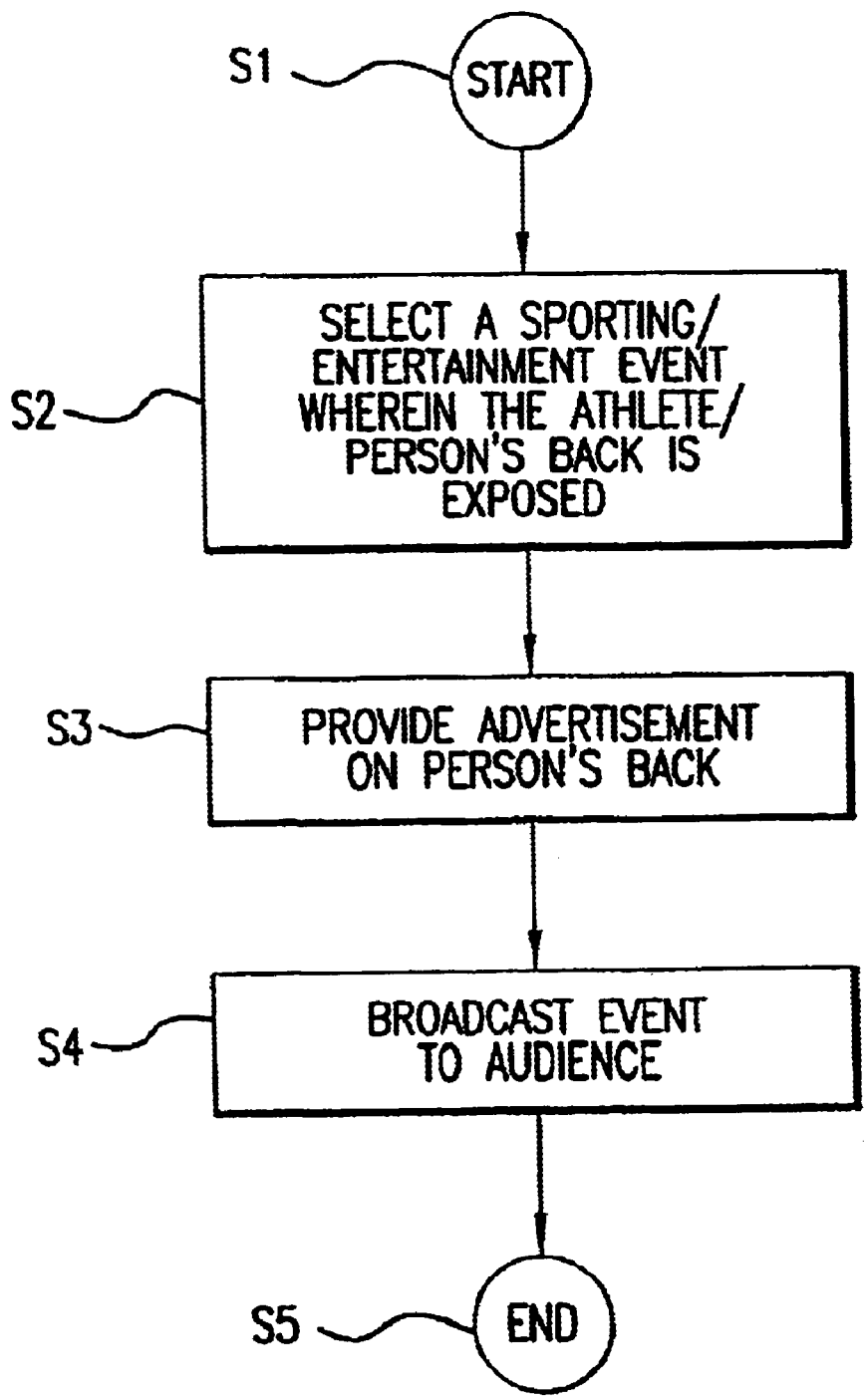
FIG. 1 is a flowchart depicting an exemplary operational sequence of steps, in accordance with a preferred embodiment of the present invention.
Figure 4:
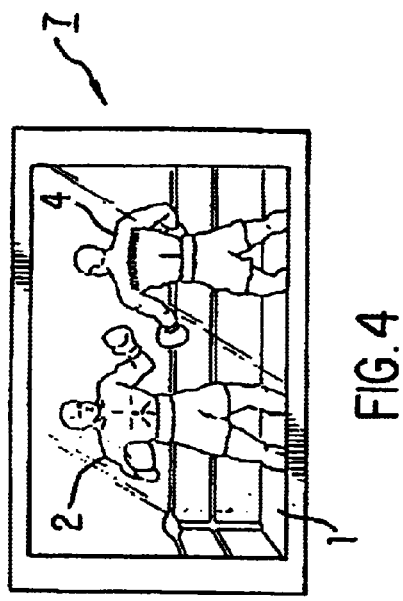
FIG. 4 is a television video image of the sporting/entertainment event of FIG. 3.

Referring now to the drawings, where like elements are designated by like reference numerals, there is shown in FIG. 1 an operative sequence of steps, representing a preferred embodiment of the present invention, starting at step S1. At step S2, a sporting/entertainment event is selected wherein the person/athlete in the particular event has an exposed upper back and shoulder region (especially, a region of uninterrupted exposed skin across and between the shoulder blades). In a preferred embodiment of the invention, the sporting/entertainment event is a professional boxing match, as discussed in more detail below. However, the invention is not limited to boxing. The invention is also applicable, but not limited to, beach volleyball, professional wrestling, platform diving, swimming, kick boxing, ultimate fighting, triathlon and the like.

Figure 2:
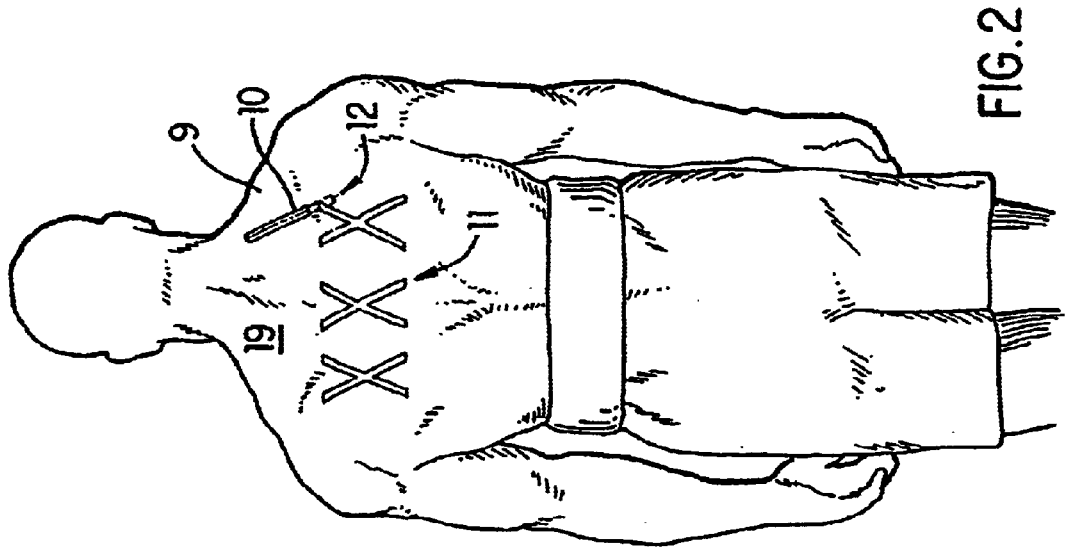
FIG. 2 is a partial elevational view of an athlete or person, operating in accordance with the preferred embodiment of FIG. 1.

In step S3, the advertisement 11 (FIG. 2) is affixed to the person's back 9 in the skin surface area 19 by any suitable marking or writing instrument 10. In the illustrated embodiment of the invention, the instrument 10 provides a contact area 12 sufficient to mark/write a legible imprint of the advertisement 11 (e.g., block letters) such that the audience viewing the competition easily notices the advertisement 11. Further, in a preferred embodiment, the marking/writing material of the instrument 10 is removable. In other words, the material is of such quality that the advertisement 11 is only temporarily displayed in the area 19 and can be removed when desired (for example, at the conclusion of the boxing match). On the other hand, the marking/writing material may be sufficiently durable and smudge-resistant such that the advertisement 11 is not easily removed during the event from physical contact and/or perspiration.

If desired, the marking/writing material 10 may include a henna dye. Other techniques, inks, dyes and paints for providing marks or writing on the human skin are mentioned in U.S. Pat. No 6,235,273 (Mackey) and U.S. Pat. No 6,013,122 (Klitzman), the entire disclosures of which are incorporated herein by reference. In an alternative embodiment of the invention, the advertising message is made of preformed characters (letters, numbers, etc.) that are applied to the upper back and shoulder region 19 by a suitable adhesive.

The advertisement 11 may be a suitable slogan, logo, trademark/service mark, URL, a domain name or advertising message (or multiples and/or combinations thereof). In the illustrated embodiment, the advertisement 11 is targeted to the audience which would be expected to constitute the particular demographic group viewing the sporting/entertainment event. For instance, if the event is a professional boxing match (described in more detail below), the advertisement 11 may be targeted to a male audience (e.g., an advertisement for men's cologne) if it is expected that the boxing match will be watched mostly by men. Alternatively, if the event is expected to be viewed more by women, the advertiser may display an advertisement 11 targeted to a female audience. If the event is expected to be viewed by a concentrated proportion of people who are inclined to wager on sporting events (especially boxing matches), the advertisement 11 may be directed toward a professional gaming service (especially a real-time or on-line gambling service).

Irrespective of the type of advertisement that is displayed, it is apparent that the present method is highly cost effective. By utilizing the exposed area 19 of the back 9, the need to spend thousands or millions of dollars in eye-catching, provocative and attractive advertisements is not necessary since the back area 19 already confers such benefits in many contexts. That is, an athlete (especially a boxer) tends to have a well defined, muscular and broad back and shoulder surface region. In this way, a simple, low-cost logo, slogan, etc. can be displayed for the product or services but yet provide tremendous brand name recognition and brand name distribution for the products or services, whereas the time and expense associated with placing the advertisement on television may already be covered by the production of the event.

In step S4, the event is broadcast to an audience. In this way, the advertisement 11 is prominently and conspicuously displayed to the same audience or customer. The advertisement 11 is eye-catching and impressionable since it is displayed on the person's back 9 on the skin surface area 19. During the boxing match, the upper back and shoulder area 19 may be tilted slightly upwardly, as the boxer leans his or her upper torso toward the opponent, such that the portion 19 of the back containing the advertisement 11 is essentially normal to the camera's line of vision. Further, the advertising method allows for repeated (or prolonged) exposure to the audience since the event can be up to several hours long. Also, since the advertisement is displayed during the actual event, assurance is provided that the advertisement will actually be seen by the desired potential customers. The advertisement 11 may be sized to be seen prominently by the television viewers. For example, the advertisement 11 may include block letters, numbers or other characters with a height of least five centimeters. The advertisement 11 is preferably long enough (side-to-side) to extend across at least a portion of both shoulder blades. For example, the advertisement 11 may cover substantial portions of both shoulder blades as well as the central portion of the upper back located between the shoulder blades.

The present advertising method may provide additional benefits from the subsequent press coverage of the particular event which can display the advertisement 11 to other customers who did not view the event in the first instance. In other words, pictures taken of the event, along with the advertisement, may be widely distributed or circulated to a much broader desired customer base outside of the original audience for the live event. The preferred method ends at step S5. In this way, a cost effective and eye-catching method of advertising is provided capable of reaching numerous consumers in an efficient manner.

Figure 3:
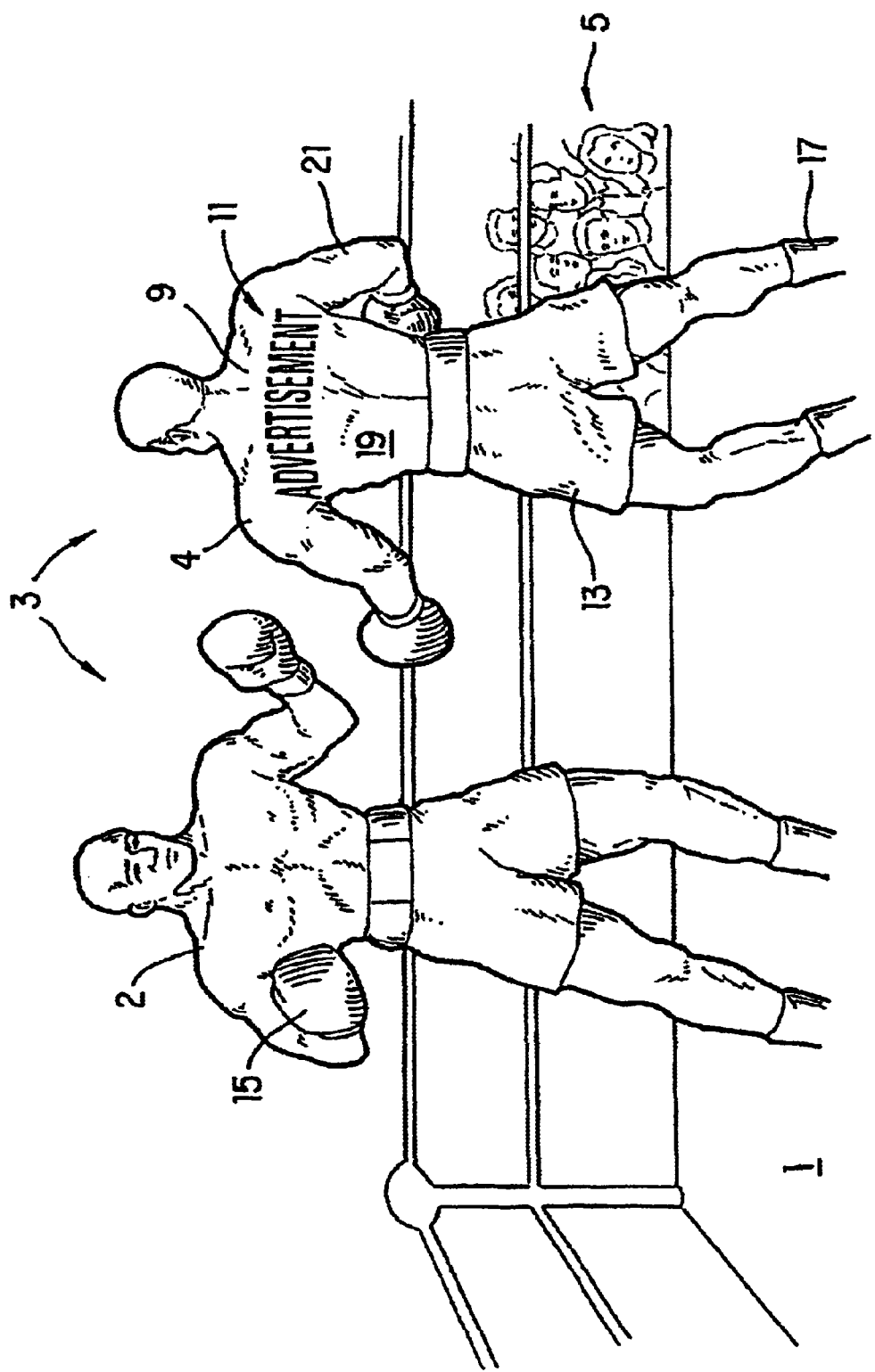
FIG. 3 depicts a sporting/entertainment event utilizing an exemplary embodiment of the present invention.

Referring now to FIG. 3, an exemplary embodiment of the present invention is provided in a boxing match 3 between athletes or boxers 2, 4 in a boxing ring 1. The boxing match 3 is witnessed by a live audience 5 and broadcast to a much larger audience (not shown) via suitable audio/visual media 7, such as a television, to the public. The larger television audience can comprise potentially millions of people. In the case of pay-per-view or cable television broadcasts, the demographic composition of the viewers of the boxing match 3 may be ascertained with relative precision. The boxers 2, 4 are wearing trunks 13, gloves 15 and boots 17. This is the traditional attire/wardrobe of the participants in this specific sport. Hence, the broad surface area provided by the bare skin of the upper back region 9 is prominently visible.

The skin surface area 19 is suitably provided for displaying advertisement 11. As provided, boxer 4 will have a back 9 which is relatively wide and substantially planar, allowing for the fixation of an advertisement 11 which is easily legible and comprehensible. That is, the back provides a larger surface area than the head region, the lateral shoulder portion, etc. Also, the back 9 does not tend to move as much during the match as the arms and legs, which makes the back 9 the preferred location for the audience to pay attention and focus on the advertisement 11. Furthermore, the back 9 of the boxer 4 is ideally muscular which may attract the attention of the audience 5 and the public through the visual media 7.

Also, as described above, the surface area 19 is typically expected to be bare and the audience 5 as well as the public audience watching through media 7 would normally expect to see nothing on the boxer's back. Hence, the advertisement 11 can be eye-catching and draw the audience's attention. Also, since the advertisement 11 is on the boxer's back 9, it will be clearly displayed without obstruction from the boxer's arms 21. In contrast, the boxer's chest may be frequently obstructed from view by the boxer's arms or the opponent 2. Also, the boxer's chest may be tilted downward during the boxing match as the boxer 4 leans toward his or her opponent 2.

The advertisement 11 can be affixed to the boxer's back 9 in the skin surface area 19 by any marking or writing instrument. In particular, the instrument will provide a contact area sufficient to mark/write a legible imprint of the advertisement 11 such that an audience viewing the match 3 can easily view the advertisement 11. Further, in a preferred embodiment, the marking/writing material is removable. In other words, the material is of such quality that the advertisement 11 is only temporarily displayed in the area 19 and can be removed when desired. However, the marking/writing material will be sufficiently smudge resistant such that the advertisement 11 will not be easily removed during the match 3 from physical contact and/or perspiration, as discussed above.

The boxing match 3 is broadcast to a public audience via media 7 and viewed by a live audience 5. In this way, the advertisement 11 is prominently and conspicuously displayed to the desired audiences and potential customers. The advertising is very eye-catching and impressionable since it is displayed on the boxer's back 9 in the skin surface area 19. Further, the advertising method allows for repeated exposure to the audience since the match 3 can be more than an hour long. The television audience can access the advertised service (e.g., an on-line wagering service) during the boxing match. Also, other residual benefits for advertising lie in the subsequent press coverage of the match 3 which can display the advertisement 11 to other customers who did not view the match 3 in the first instance. In other words, pictures taken of the match 3, along with the advertisement 11, may be broadly distributed or circulated to a much broader customer base outside of the original audience that view the live match 3.

While the invention has been described in detail in connection with preferred embodiments known at the time, it should be readily understood that the invention is not limited to the disclosed embodiments. Rather, the invention can be modified to incorporate variations, alterations, substitutions or equivalent arrangements not heretofore described, but which are commensurate with the spirit and scope of the invention, as defined by the appended claims.

For example, although the invention has been described in connection with reference to a boxing match, the invention may also be applicable to other widely broadcast, sporting and/or entertainment events. For example, as mentioned above, the invention can be implemented in, but not limited to, beach volleyball, professional wrestling, platform diving, swimming, kick boxing, ultimate fighting and triathlons. Accordingly, the invention is not limited by the foregoing description or drawings, but is only limited by the scope of the appended claims.

What is claimed as new and desired to be protected by Letters Patent of the United States is:

1. A method of advertising, said method comprising the steps of:

providing a back skin surface area of a person, said back skin surface area extending over and between the shoulder blades of said person; and affixing an advertisement on said back skin surface area, such that said advertisement extends over and between said shoulder blades of said person;

subsequently, displaying said advertisement to an audience; and subsequently, removing said advertisement from said back skin surface area of said person.

2. The method of claim 1, wherein said advertisement is selected from the group consisting of slogan, logo, trademark, service mark, URL and domain name.

3. The method of claim 1, wherein said displaying step occurs during a sporting event.

4. The method of claim 3, wherein said sporting event is a boxing match.

5. The method of claim 3, wherein said sporting event is selected from the group consisting of beach volleyball, professional wrestling, platform diving, swimming, kick boxing, ultimate fighting and triathlon.

6. The method of claim 4, further comprising the step of broadcasting a video image of said boxing match to a second audience.

7. The method of claim 1, wherein said step of affixing said advertisement includes the step of applying a smudge-resistant material to said back skin surface area.

8. A removable display advertisement for use during a sporting event to be viewed by an audience for said sporting event, said removable display advertisement comprising:

a first character located over at least a portion of a first shoulder blade on an exposed skin surface area of an athlete in said sporting event;

a second character located over at least a portion of the second shoulder blade on said exposed surface area of said athlete;

an advertising message for said audience of said sporting event, said advertising message including at least said first and second characters.

9. The display advertisement of claim 8 wherein said first and second characters are formed of a smudge-resistant material.

10. The removable display advertisement of claim 9, wherein said smudge-resistant material is removable from said skin surface area by washing subsequent to said sporting event.

11. The removable display advertisement of claim 10, wherein said advertising message is selected from the group consisting of slogan, logo, trademark, service mark, URL and domain name.

12. The removable display advertisement of claim 10, wherein said advertising message promotes an on-line wagering service.

13. The method of claim 6, wherein said advertisement is selected from the group consisting of slogan, logo, trademark, service mark, URL and domain name; and wherein said step of affixing said advertisement on said back skin surface area includes the step of applying a smudge-resistant material to said back skin surface area; and wherein said advertisement is affixed at a location where the person's skin is not covered by clothing or equipment; and wherein said first audience is an audience for said boxing match; and wherein said advertisement is sufficiently large enough to be read by said first and second audiences, with a first character of said advertisement being located over at least a portion of a first shoulder blade on an exposed skin surface area of an athlete in said boxing match, and with a second character of said advertisement being located over at least a portion of the second shoulder blade on said exposed surface area of said athlete; and wherein said first and second characters are formed of said smudge-resistant material; and wherein said step of removing said advertisement includes the step of washing said skin surface area subsequent to said boxing match.

14. A method of advertising, said method comprising the steps of:

providing an image of an advertisement, wherein said advertisement is formed on a back skin surface area of a boxer for a boxing match having an audience, said back skin surface area extending over and between the shoulder blades of said boxer, and wherein said advertisement is affixed on said back skin surface area, such that said advertisement extends over and between said shoulder blades of said boxer; and distributing said image of said advertisement such that said image of said advertisement is seen by consumers other than said boxing match audience.

15. The method of claim 14, wherein said distributing step includes the step of providing said image for use in subsequent press coverage of said boxing match.

* * * * *